United States Patent [19]
Arai

[11] Patent Number: 5,761,528
[45] Date of Patent: Jun. 2, 1998

[54] MULTI-FUNCTIONS I/O MEMORY CARD WHICH CHANGES THE CONTROL PROGRAM IN RESPONSE TO FUNCTION SELECTION

[75] Inventor: Yasuhiro Arai, Kawasaki, Japan

[73] Assignee: Fujitsu Limited, Kawasaki, Japan

[21] Appl. No.: 855,653

[22] Filed: May 14, 1997

Related U.S. Application Data

[63] Continuation of Ser. No. 206,144, Mar. 7, 1994, abandoned.

[30] Foreign Application Priority Data

Mar. 23, 1993 [JP] Japan .................................... 5-063552

[51] Int. Cl.[6] .............................. G06F 9/06; G06F 13/00
[52] U.S. Cl. ...................................... 395/822; 395/834
[58] Field of Search ................................ 395/822, 828, 395/830, 834, 833

[56] References Cited

U.S. PATENT DOCUMENTS

| | | | |
|---|---|---|---|
| 3,978,455 | 8/1976 | Valassis et al. | 395/834 |
| 4,930,129 | 5/1990 | Takahira | 371/40.4 |
| 5,161,169 | 11/1992 | Galano et al. | 375/8 |
| 5,210,854 | 5/1993 | Beaverton et al. | 395/834 |
| 5,261,055 | 11/1993 | Moran et al. | 395/834 |
| 5,335,352 | 8/1994 | Yanai et al. | 395/800 |
| 5,428,813 | 6/1995 | Simmering et al. | 395/800 |

FOREIGN PATENT DOCUMENTS

| | | |
|---|---|---|
| 0 096 407 | 12/1983 | European Pat. Off. . |
| 0 501 619 | 9/1992 | European Pat. Off. . |

OTHER PUBLICATIONS

Flynn, Mary Kathleen "PCMCIA Cards", PC Magazine Jan. 26 1993 v12 n2 p.29.
Rosch, Winn "PCMCIA: the expansion system of the future", PC Magazine Jan. 26 1993 v12 n2 p.321.
Case, Brian "PCMCIA defines standard for PC cards" Microprocessor Report, Dec. 9 1992 v6 n16 p17(6).
Sternglass, Daniel, "The future is in the PC cards", *IEEE SPECTRUM*, Vol. 29, No. 6, Jun. 1992, New York, NY, pp. 46–50.

Primary Examiner—Dinh C. Dung
Attorney, Agent, or Firm—Staas & Halsey

[57] ABSTRACT

An I/O memory card includes a first unit for storing card attribute information describing a plurality of card attributes of the I/O memory card, the card attributes respectively corresponding to different functions of the I/O memory cards. A second unit selects one of the plurality of card attributes in response to and as specified by a setting signal so that the I/O memory card provides a function corresponding to the selected one of the plurality of card attributes.

14 Claims, 6 Drawing Sheets

MULTI-FUNCTIONS I/O MEMORY CARD WHICH CHANGES THE CONTROL PROGRAM IN RESPONSE TO FUNCTION SELECTION

This application is a continuation of application Ser. No. 08/206,144, filed Mar. 3, 1994, now abandoned.

BACKGROUND OF THE INVENTION

1. Field of the Invention

The present invention generally relates to an I/O (Input/Output) memory card equipped with a memory, and more particularly to an I/O memory card which conforms to a JEIDA/PCMCIA (Japan Electronic Industry Development Association/Personal Computer Memory Card International Association) standard or a similar standard.

2. Description of the Prior Art

A communications device is known in which a communications protocol, a network control sequence and/or a modulation/demodulation program are stored in a ROM (Read Only Memory) or a RAM (Random Access Memory). Examples of such communications devices are those used in a LAN (Local Area Network) and in an ISDN (Integrated Services Digital Network). When such information necessary to control communications is revised or modified, it is necessary to update the contents of the memories built in the communications devices.

Referring to FIG. 1A, a ROM 101a provided in a communications device 101 stores, for example, information concerning the communications protocol. When the communications protocol is updated or modified, the ROM 101a is replaced by a ROM 101a' storing updated communications protocol. However, in practice, it is not easy to perform such a replacement.

Recently, an I/O card type communications control device which conforms to the JEIDA/PCMCIA standard has been developed. Examples of such an I/O card type communications control device are an I/O card type modem (modulator and demodulator) and an I/O card type LAN.

FIG. 1B shows such an I/O card type communications control device 102, which includes a system ROM 103 provided in a package of an I/O card. The system ROM 103 stores system information concerning a communications protocol. Since the system ROM 103 is packaged, it is very difficult to modify or revise the contents of the ROM 103.

For the above reason, normally, a modification or revision of the design-completed I/O card is not performed. If a defect has occurred in the communications control device 102, it is replaced by a new one.

SUMMARY OF THE INVENTION

It is an object of the present invention to provide an I/O memory card in which the contents of a memory provided therein can be modified whereby it is not necessary to replace the I/O memory card by a new one when it is required to modify the contents of the memory.

A more specific object of the present invention is to provide an I/O memory card having a plurality of selectable card configurations so that the I/O memory card functions as a memory card, a modem card or the like.

The above objects of the present invention are achieved by an I/O memory card comprising: first means for storing card attribute information describing a plurality of card attributes of the I/O memory card, the card attributes respectively corresponding to different functions of the I/O memory cards; and second means for selecting one of the plurality of card attributes in response to a setting signal so that the I/O memory card provides a function corresponding to a specified one of the plurality of card attributes.

Another object of the present invention is to provide a method of controlling the above I/O memory card.

This object of the present invention is achieved by an I/O memory card control method for controlling an I/O memory card storing card attribute information describing a plurality of card attributes of the I/O memory card, wherein the card attributes respectively correspond to different functions of the I/O memory cards, the I/O memory card control method comprising the steps of:

(a) generating a setting signal; and (b) selecting one of the plurality of card attributes in response to the setting signal so that the I/O memory card provides a function corresponding to a specified one of the plurality of card attributes.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1A:
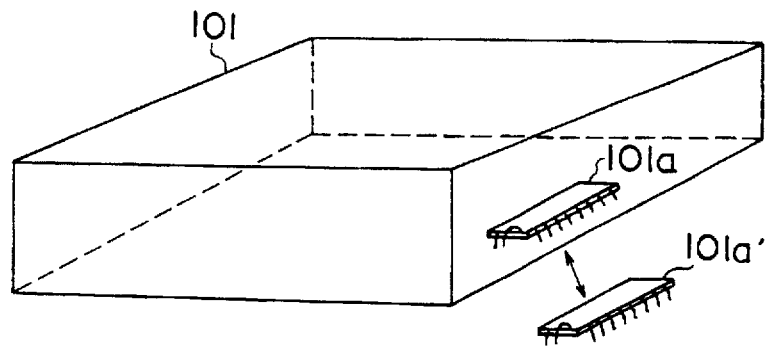
FIGS. 1A and 1B are diagrams showing prior art.
Figure 1B:
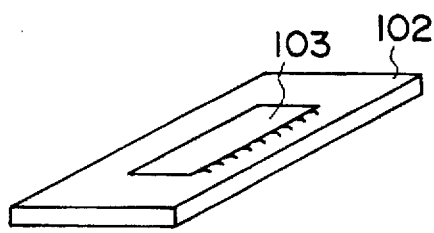
Figure 2:
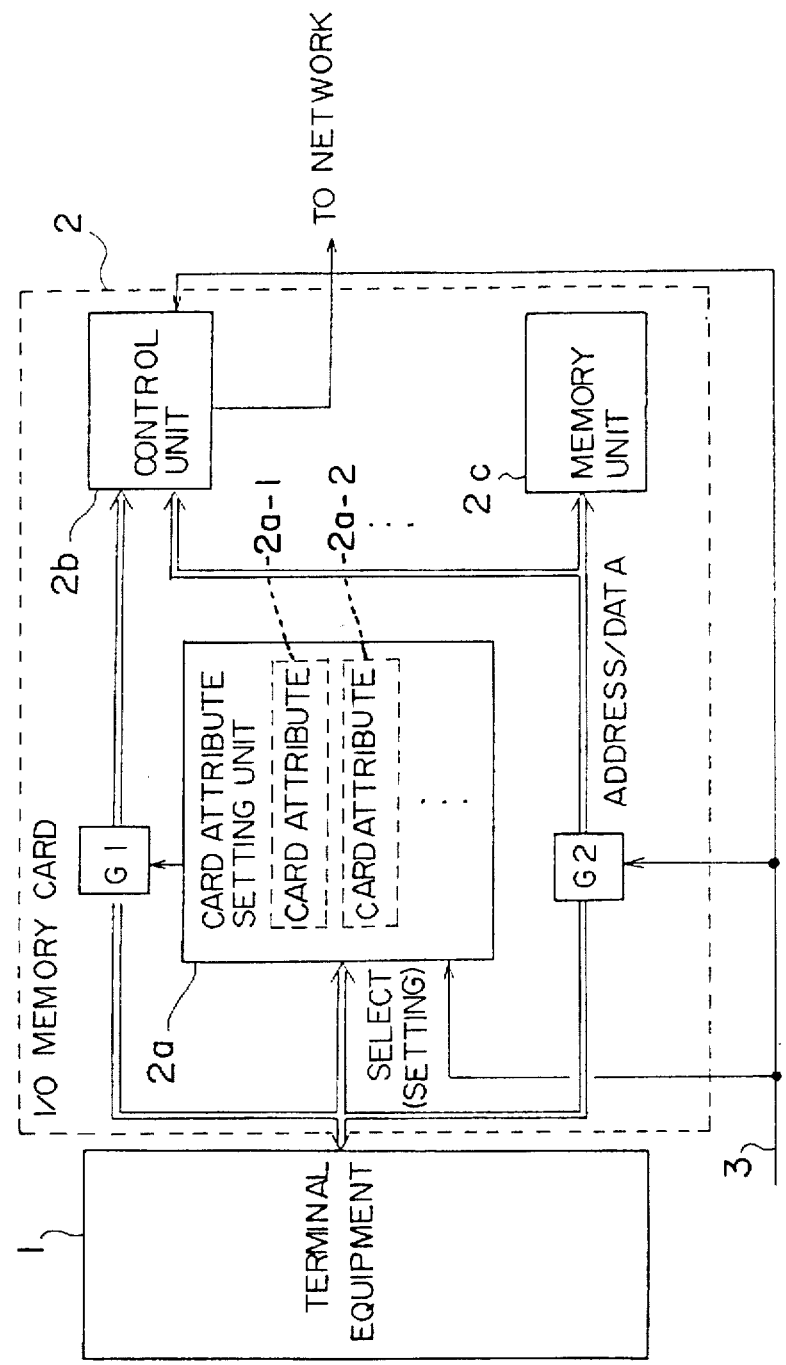
FIG. 2 is a block diagram of the principle of the present invention.

FIG. 2 is a block diagram showing the principle of an I/O memory card 2 according to the present invention. An I/O memory card 2 connected to a terminal equipment 1, includes a card attribute setting unit 2a, a control unit 2b, a memory unit 2c and gate circuits G1 and G2. The card attribute setting unit 2a includes plural information blocks 2a-1, 2a-2, ... which determine respective card attributes of the I/O memory card. For example, when one of the information blocks (that is, one of the card attributes) is selected in response to a card attribute setting signal 3, the I/O memory card is caused to operate in accordance with the card attribute (function or mode) specified by the card attribute setting signal 3. The card attribute setting signal 3 is generated by, for example, a switch attached to the I/O memory card 2 in order to generate the card attribute setting signal 3.

The memory unit 2c stores one or more system programs necessary for realizing one or more card attributes of the I/O memory card 2. Each system program includes control information which is referred to when the system program is executed. For example, the memory unit 2c includes a system program which causes the I/O memory card 2 to operate at a modem. If the I/O memory card 2 is used as not only a modem but also a LAN interface device connected to a LAN, a plurality of system programs respectively related to the modem and the LAN interface device are stored in the memory unit 2c.

For example, when the I/O memory card 2 is caused to operate as a modem, the card attribute setting signal 3 is applied to the card attribute setting unit 2a. In response to the card attribute setting signal 3, the information block 2a-1 related to the modem attribute is selected, so that the I/O memory card 2 is set to the modem attribute. In this case, the information block 2a-1 related to the modem attribute is set in the card attribute setting unit 2a. Then, the terminal equipment 1 accesses the card attribute setting unit 2a and the card attribute which is set therein. In the example being considered, the terminal equipment 1 recognizes that the modem attribute is specified in the card attribute setting unit 2a, and obtains, from the specified card attribute, necessary information for performing communications via the I/O memory card 2.

Thereafter, the above card attribute setting signal 3 is and the gate G2. The card attribute setting unit 2a controls the gate G1 in response to the card attribute setting signal 3. Due to the functions of the gates G1 and G2, the terminal equipment 1 is connected selectively to the control unit 2b or to the memory unit 2c. Data and address signals can be transferred between the terminal equipment 1 and the control unit 2b and between the terminal equipment 1 and the memory unit 2c.

The above card attribute setting signal 3 is also sent to the control unit 2b. The control unit 2b accesses the memory unit 2c and reads the system program related to the modem attribute. For example, the control unit 2b reads a communications protocol, a network control sequence and a modulation/demodulation program. Then, the control unit 2b starts to operate so that the I/O memory card 2 operates as a modem. The control unit 2b is coupled to a network (not shown in FIG. 2) and transfers data between the terminal equipment 1 and a remote terminal equipment via the network.

If it is desired to switch the card attribute of the I/O memory card 2 from the modem to the memory card, the terminal equipment 1 sends the card attribute setting signal 3, specifying the memory card, to the card attribute setting unit 2a, the gate G2 and the control unit 2b. In response to the card attribute setting signal 3, the memory attribute is set in the card attribute setting unit 2a and the gate G2 is opened. The terminal equipment 1 obtains, from the card attribute set in the card attribute setting unit 2a, information necessary when the I/O memory card 2 is used as a memory card.

If it is required that the contents of the memory unit 2c be modified, the I/O memory card 2 is set to the memory attribute. In the memory attribute, the terminal equipment 1 accesses the memory unit 2c via the gate G2, and modifies the contents of the memory unit 2c. Thereby, it is possible to modify or revise the system program related to the modem attribute.

Figure 3:
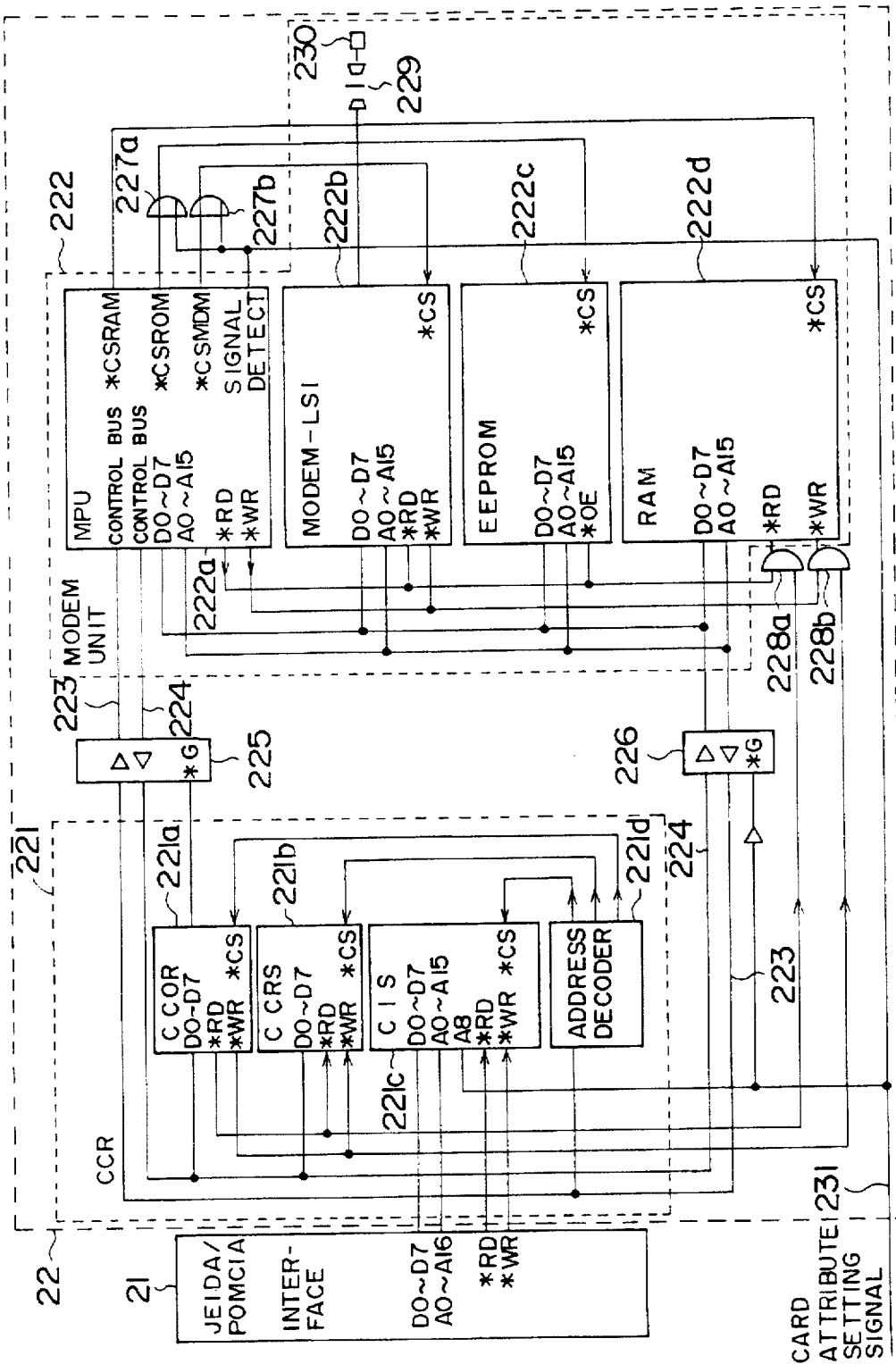
FIG. 3 is a block diagram of an I/O memory card according to an embodiment of the present invention.

FIG. 3 is a block diagram of an I/O memory card 22 according to an embodiment of the present invention. The I/O memory card 22 primarily functions as a modem card. The I/O memory card 22 is connected to a JEIDA/PCMCIA interface 21 (which is hereinafter referred to as a terminal equipment). The I/O memory card 22 includes a card configuration register card (abbreviated as CCR) 221, and a modem unit 222, which corresponds to the control unit 2b and the memory unit 2c shown in FIG. 2.

The card configuration register card 221 includes a card configuration option register (CCOR) 221a, a card configuration status register (CCSR) 221b, a card information structure (CIS) unit 221c, and an address decoder 221d. The card information structure unit 221c includes a plurality of information blocks which define respective card attributes. The card attribute is determined by selecting one of the information blocks by a card attribute setting signal 231.

The modem unit 222 includes a microprocessor unit (MPU) 222a, a modem LSI 222b, an EEPROM (Electrically Erasable and Programmable Read Only Memory) 222c, and a RAM (Random Access Memory) 222d. The microprocessor unit 222a performs a control operation for providing the function of the I/O memory card 22. For example, the microprocessor unit 222a performs the control operation for providing a modem function defined by the contents of the EEPROM 222c (system ROM). The modem LSI 222b sends and receives a data signal under the control of the microprocessor unit 222a. The EEPROM 222c stores a system program describing the modem functions. For example, the EEPROM 222c stores a system program describing a communications protocol, a network control sequence, a modulation/demodulation program and so on.

Further, the modem unit 222 includes an address bus 223, a data bus 224, gates 225 and 226 for connecting address and data buses of the card configuration option register (CCR) 221 and address and data buses of the modem unit 222, two OR gates 227a and 227b, two AND gates 228a and 228b, a line transformer 229, and a modular plug 230. The card attribute setting signal 231, which specifies one of the card attributes, is applied to the card configuration register (CCR) 221 and the modem unit 222, as shown in FIG. 3.

The card configuration option register 221a is, for example, an eight-bit register in which data for setting of the communications ports and resetting software is stored. The card configuration status register 221b is, for example, an eight-bit register in which data for activating a ringer signal, specifying a power-down mode, and activating an audio monitor signal is stored. The card information structure 221c is, for example, an eight-bit ROM in which manufacturer information and interrupt mode information are stored. The address decoder 221d decodes address information sent via the bus interface 21, and sets the chip select signals supplied to the parts 221a, 221b and 211c specified by the address information.

Figure 4:
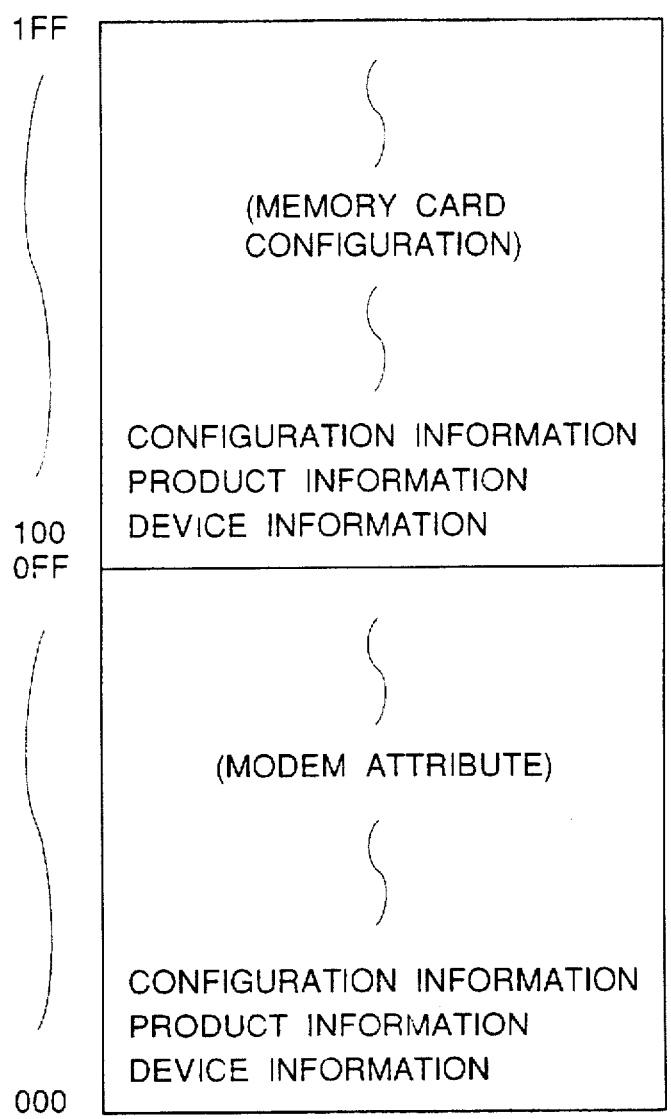
FIG. 4 is a diagram showing information blocks describing card attributes.

FIG. 4 shows two information blocks describing the respective card attributes, these information blocks being provided in the card information structure unit 221c. A storage area between lower addresses 000 and 0FF stores the modem attribute, which contains device information concerning the I/O memory card 22, product information indicating the manufacturer and the version number of the device, and configuration information. A storage area between upper addresses 100 and 1FF stores the memory attribute, which contains device information concerning the I/O memory card 22, product information indicating the manufacturer and the version number of the device, and configuration information. The card attribute setting signal 231 selects one of the storage areas formed in the card information structure unit 221c. It is possible to provide other blocks, which respectively define other card configurations, in the card information structure unit 221c.

A description will now be given of the operation of the I/O memory card 22 performed when it operates as a modem. In this case, the card attribute setting signal 231 is set to, for example, the ground level, and thus the I/O memory card is set to the modem attribute.

First, the terminal equipment 21 sends the address signal to the card information structure unit 221c and reads the contents thereof. The above address signal consists of A0–A15. The terminal equipment 21 sends the address bits A0–A7 and A9–A15, and the remaining address bit A8 is specified by the card attribute setting signal 231. The terminal equipment 21 receives data having data bits D0–D7 arranged in parallel from the unit 221, and knows that the modem attribute is set therein.

Next, the terminal equipment 21 writes a modem enable signal into the card configuration option register (CCOR) 221a, which opens the gate 225. Thereby, the data bus 224 and the address bus 223 of the card configuration register 221 are connected to the modem unit 222.

Then, in response to a control signal sent from the terminal equipment 21 to the modem unit 222, the microprocessor unit 222a reads the contents of the EEPROM 222c (the communications protocol, the network control sequence and the modulation/demodulation program), and transfers the read memory contents to the RAM 222d. Then, the microprocessor unit 222a starts the modem operation. In this operation, the RAM 222d is used as a work memory of the microprocessor unit 222a. According to instructions issued by the microprocessor unit 222a, the modem LSI 222b sends modulated data signals to a remote terminal equipment via a network and receives modulated data signals from a remote terminal via the network.

Figure 5:
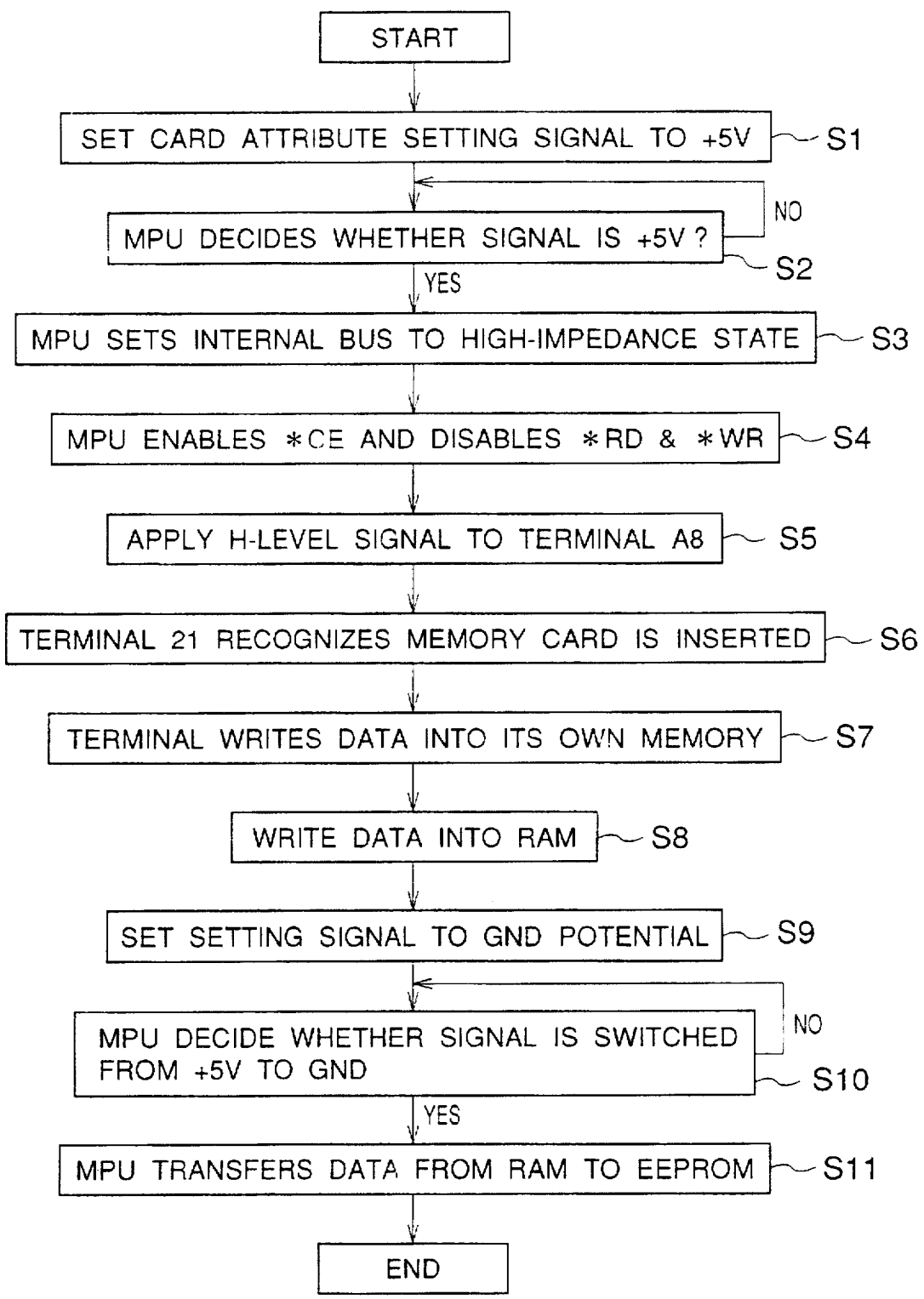
FIG. 5 is a flowchart of a sequence of modifying the contents of a system ROM provided in the I/O memory card according to the embodiment of the present invention.

When it is required to modify the contents of the EEPROM 222c due to a revision of the communications program of the I/O memory card 22 or the like, a sequence shown in FIG. 5 is performed.

In step S1 shown in FIG. 5, the level of the card attribute setting signal 231 is set to, for example, +5V. The card attribute setting signal 231 is applied to the modem LSI 222b and the EEPROM 222c via the OR gates 227a and 227b. Hence, chip select terminals *CS (symbol "*" denotes the active-low logic) of the modem LSI 222b and the EEPROM 222c are switched to a high level, and the bus outputs thereof are switched to a high-impedance state.

The card attribute setting signal 231 is applied to a card attribute setting signal detection terminal of the microprocessor unit 222a which detects, in step S2, that the card attribute setting signal 231 is in the high level and sets its internal bus to the high-impedance state in step S3. In step S4, the microprocessor unit 222a switches a read signal *RD and a write signal *WR to the high level (disabled state), and switches a chip select signal *CS applied to the RAM 222d to the low level. Thereby, the RAM 222d is set to the selected state. Further, when the card attribute setting signal 231 is switched to the high level, the terminal A8 of the card information structure unit 222c is switched to the high level, whereby the storage area corresponding to the upper address space between the upper addresses 100 and 1FF shown in FIG. 4 is selected in step S5.

As has been described previously, information concerning the memory card attribute is stored in the storage area corresponding to the upper address space between the upper addresses 100 and 1FF. The terminal equipment 21 reads the contents of the card information structure unit 221c of the I/O memory card 22, and recognizes that a memory card is connected to the terminal equipment 21 in step S6.

Since the card attribute information indicates the memory attribute, the terminal equipment 21 can access the I/O memory card 22 in the same manner as the terminal equipment 21 accesses a normal memory card. Hence, in step S7 shown in FIG. 5, data stored in a memory of the terminal equipment 21 is transferred to the I/O memory card 22 and is written into the EEPROM 222c.

The gate 226 of the I/O memory card 22 is kept open by the card attribute setting signal 231. When the terminal equipment 21 sets the write signal *WR to the low level, and the write address of the RAM 222d and write data are transferred via the address bus and the data bus, the output signal of the AND gate 228a is switched to the low level, so that the RAM 222d is switched to the write enable state. Then, the data from the terminal equipment 21 is written into the RAM 222d via the gate 226 in step S8.

When the writing of data into the RAM 222d is completed, the card attribute mode setting signal 231 is switched to the ground level in step S9. The microprocessor unit 222a provided in the modem unit 222 of the I/O memory card 22 detects the switching in which the card attribute setting signal 231 is switched from +5V to the ground level in step S10. In step S11, the microprocessor unit 222a transfers the data written into the RAM 222d to the EEPROM 222c into which the transferred data is written.

In the above operation, data to be written into the EEPROM 222c is written into the RAM 222d and is then transferred to the EEPROM 222c. Alternatively, it is possible to directly write data from the terminal equipment 21 into the EEPROM 222c. In this case, attribute information concerning a flash memory stored in the card information structure unit 221c is selected when the card attribute setting signal 231 is switched to the ground level.

Figure 6A:
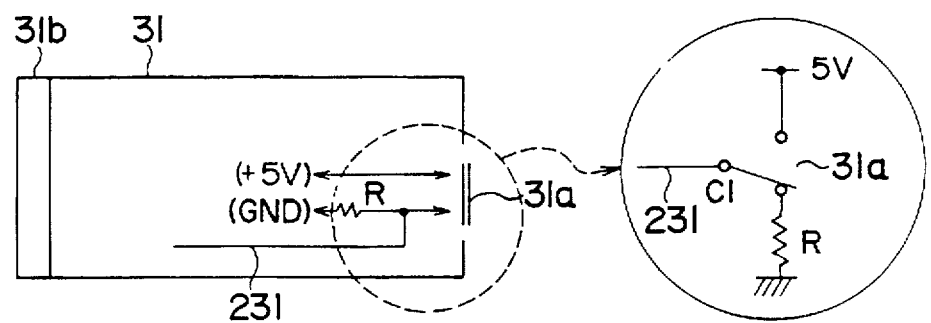
FIG. 6A is a block diagram of a structure for generating a card attribute setting signal.

FIG. 6A shows a structure for generating the card attribute setting signal 231. An I/O memory card having terminals connected to the terminal equipment 21 is equipped with a setting switch 31a. When the setting switch 31a has not been pushed, a movable switch contact C1, via which the card attribute setting signal 231 is output, is grounded via a resistor R. Hence, the card attribute setting signal 231 is switched to the ground level. When the setting switch 31a has been pushed, the movable switch contact C1 receives the voltage +5V, so that the card attribute setting signal 231 is switched to the high level.

Figure 6B:
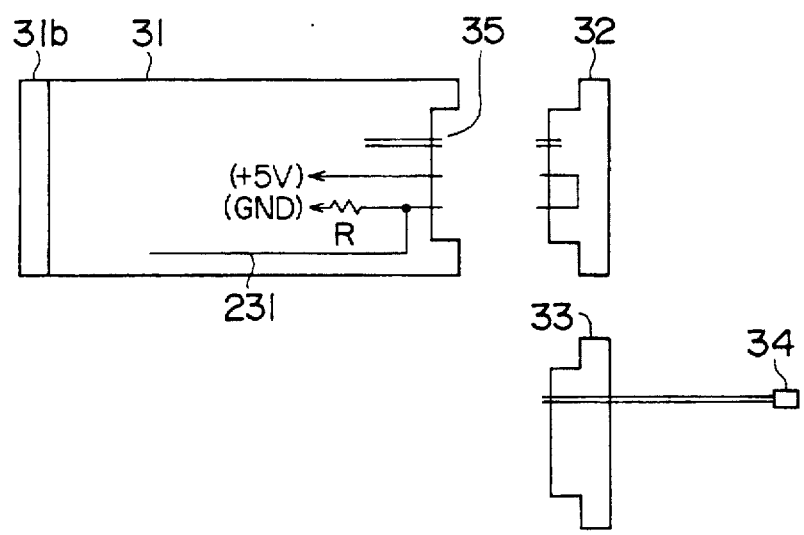
FIG. 6B is a block diagram of another structure for generating a card attribute setting signal.

FIG. 6B shows another structure for generating the card attribute setting signal 231. The I/O memory card 31 has a connector 35 with which a connector 32 or a connector 33 can be engaged. The connector 32 is used when the card attribute setting signal 231 is switched to the high level (turned ON). When the connector 32 is engaged with the connector 35, the voltage +5V is applied to one end of the resistor R, and hence the high-level card attribute setting signal 231 is generated. In this case, the I/O memory card 31 functions as a memory, and it is not necessary to transfer modulated and demodulated signals.

When the connector 33 is engaged with the connector 35, the voltage +5V is not applied to one end of the resistor R, whereby the card attribute setting signal 231 is switched to the ground level. Thereby, the I/O memory card 31 functions as a modem. The connector 33 has a terminal coupled to a plug 34, which is connected to a communications line of a network.

Other structures for generating the card attribute generating signal 231 can be made. For example, a specific address of the card configuration register 221 is assigned to the card attribute setting signal 231. The terminal equipment 21 accesses the card configuration register 221 with the specific address. A storage area specified by the specific address stores the set card attribute information. Further, it is possible for the terminal equipment 21 to generate the card attribute setting signal 231.

According to the present invention, a plurality of information blocks respectively describe attribute information of the I/O memory card, and one of these information blocks is selected. Hence, the terminal equipment can recognize that an I/O memory card having a function is replaced with another I/O memory card having another function. Further, when the attribute of the I/O memory card is set to the memory attribute, the terminal equipment can handle the I/O memory card as a normal memory card. Hence, the I/O memory card which is expected to be mainly used as a modem can be used as a memory when it is not used as a modem. It is to be noted that a conventional I/O memory card, specifically functioning as a modem, does not allow the terminal equipment to directly access the EEPROM in order to modify the contents of the EEPROM. Furthermore, it is easily possible to modify the contents of the memory of the I/O memory card. Hence, it is not necessary to replace the currently used I/O memory card by another one when the function of the modem or the communications sequence is modified.

The present invention is not limited to the specifically disclosed embodiments, and variations and modifications may be made without departing from the scope of the present invention.

What is claimed is:

1. An I/O memory card, comprising:
   first storing means for storing card attribute information, recognizable by an external device connected to the I/O memory card, and for describing a plurality of card attributes of the I/O memory card, the card attributes respectively corresponding to a plurality of different functions of the I/O memory cards;
   selecting means for selecting a specified one of the plurality of card attributes in response to, and as specified by, a corresponding setting signal and so that the I/O memory card provides a function corresponding to the selected, specified one of the plurality of card attributes;
   second storing means for storing a program necessary for the I/O memory card to provide a function; and
   controlling means for controlling the second storing means so that the program stored therein can be updated in response to the setting signal.

2. The I/O memory card as claimed in claim 1, further comprising third means for storing a program necessary for the I/O memory card to provide the function corresponding to the selected one of the plurality of card attributes.

3. The I/O memory card as claimed in claim 1, further comprising setting signal generating means for generating and outputting the card attribute setting signal.

4. The I/O memory card as claimed in claim 3, wherein:
   said setting signal generating means further comprises a first connector receiving a first voltage and a second voltage;
   the first connector is engaged with a second connector; and
   a first one of the first voltage and the second voltage is selected when the second connector is engaged with the first connector, said first one of the first voltage and the second voltage serving as the card attribute setting signal output of the third means and selecting a corresponding, first one of the plurality of the card attributes.

5. The I/O memory card as claimed in claim 4, wherein:
   the first connector is engaged with a third connector; and
   a second one of the first voltage and the second voltage is selected when the third connector is engaged with first connector, the second one of the first voltage and the second voltage serving as the card attribute setting signal and selecting a different and corresponding, second one of the plurality of card attributes.

6. The I/O memory card as claimed in claim 5, wherein said second connector does not have a terminal connected to a communications line for transferring a data signal, and said third connector has a terminal connected to the communications line.

7. The I/O memory card as claimed in claim 3, wherein said setting signal generating means comprises a switch.

8. The I/O memory card as claimed in claim 1, wherein the card attribute setting signal is included in an address signal applied to the I/O memory card.

9. The I/O memory card as claimed in claim 1, wherein:
   said first storing means, further, stores card attribute information describing a plurality of card attributes including a memory attribute, and said controlling means, further, controls the second storing means so that the program stored therein can be updated in response to the setting signal selecting the memory attribute.

10. The I/O memory card as claimed in claim 9, wherein:
    said second storing means has a first memory block for storing a program necessary for the I/O memory card to provide a function corresponding to the selected one of the card attributes and a second memory block for storing data.

11. The I/O memory card as claimed in claim 10, wherein:
    said first memory block further comprises an erasable and programmable memory; and
    the I/O memory card further comprises data transferring means for transferring data from an external device to the erasable and programmable memory when the I/O memory card selectively functions as a memory, so that the program stored in the erasable and programmable memory can be programmed.

12. An I/O memory card control method for controlling an I/O memory card storing card attribute information, recognizable by an external device connected to the I/O memory card, describing a plurality of card attributes of the I/O memory card, wherein the card attributes respectively correspond to different functions of the I/O memory cards, said I/O memory card control method comprising the steps of:
    (a) generating a setting signal specifying a related one of the card attributes;
    (b) selecting the corresponding one of the plurality of card attributes, in response to said setting signal, so that the I/O memory card provides a function corresponding to the selected one of the plurality of card attributes; and
    (c) changing the program necessary for the I/O card to provide the function stored therein.

13. The I/O memory card control method as claimed in claim 12, wherein the plurality of card attributes comprises a modem attribute and a memory attribute and the I/O memory card has a memory storing a program necessary for the I/O memory card to function as a modem, the I/O memory card control method further comprising the steps of:
    (c) selecting the memory attribute in accordance with, and by using, the card attribute setting signal; and
    (d) accessing said memory storing the program in a state in which the I/O memory card is set to the memory attribute, so that the program stored in said memory can be modified.

14. The I/O memory card control method as claimed in claim 12. wherein the plurality of card attributes comprises a modem attribute and a memory attribute and the I/O memory card has a memory storing a program necessary for the I/O memory card to function as a modem. the I/O memory card control method further comprising the step of:

(c) selecting the memory attribute in accordance with. and by. the card attribute setting signal when the I/O memory card is not used as a modem. so that the I/O memory card is used as a memory card.

* * * * *